Patented July 28, 1942

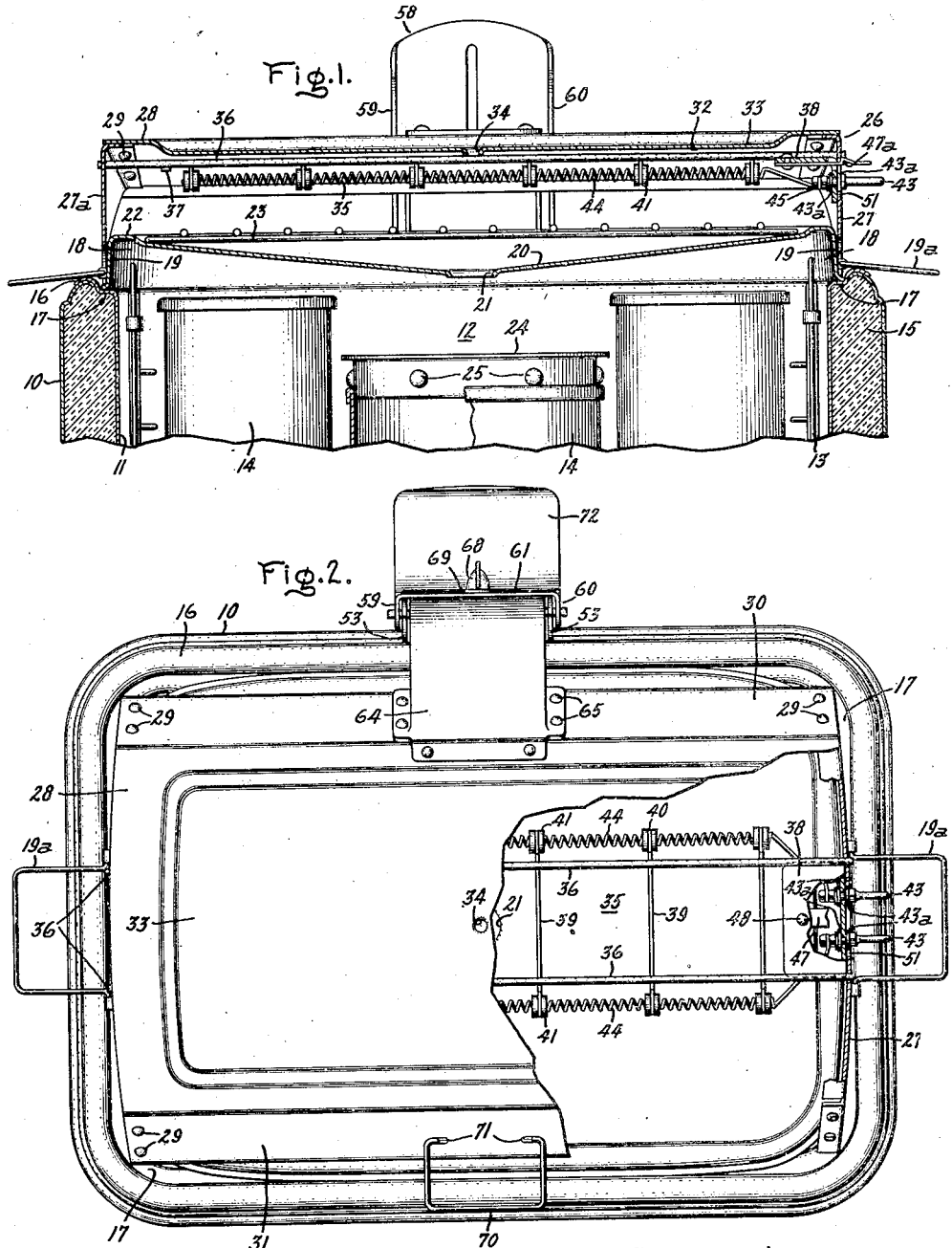

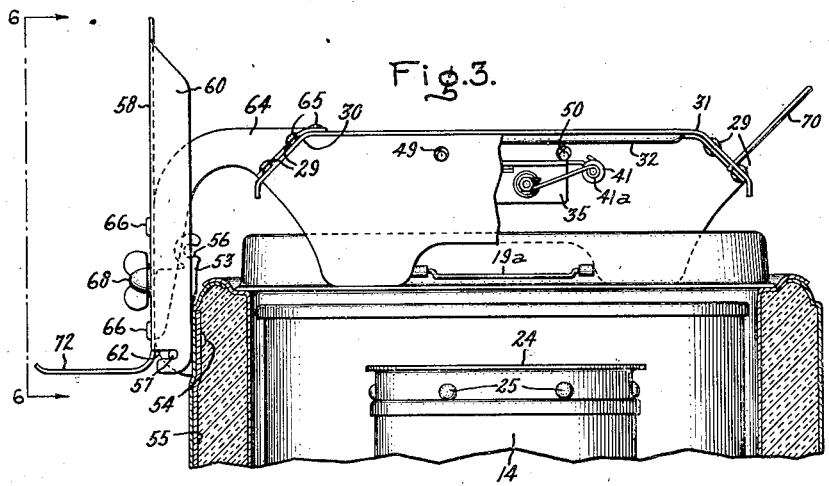
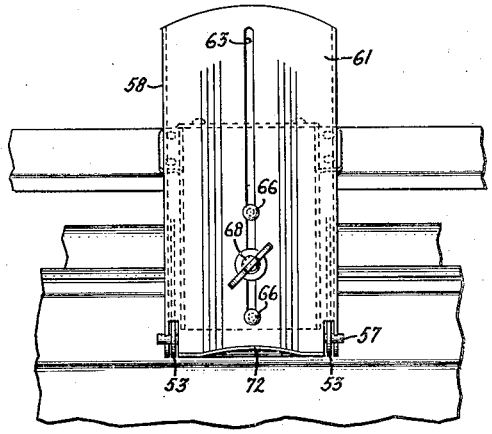
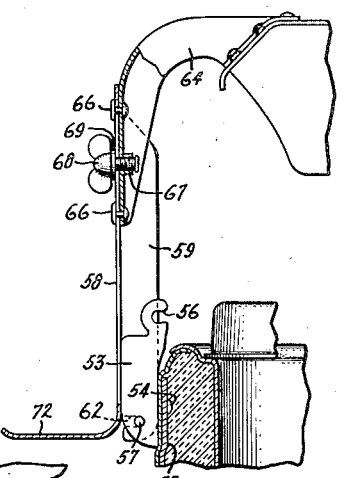
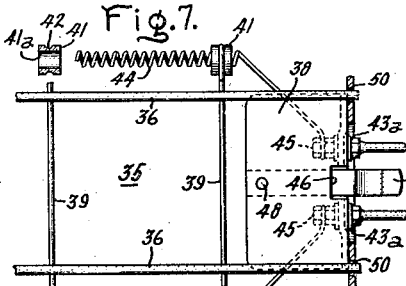
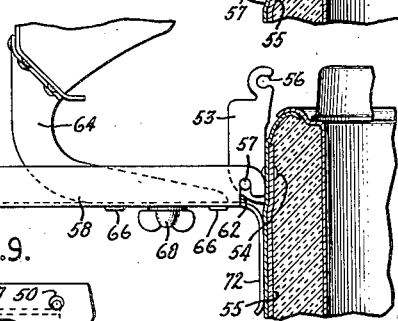
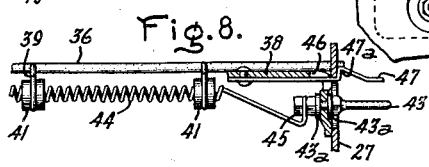
Inventors:
Harry W. Uhlrig,
David W. Gustaveson,
by Harry E. Dunham
Their Attorney.

2,291,359

UNITED STATES PATENT OFFICE 2,291,359

COOKING DEVICE

Harry W. Uhlrig, Stratford, and David W. Gustaveson, Bridgeport, Conn., assignors to General Electric Company, a corporation of New York Original application January 26, 1939, Serial No. 252,952. Divided and this application December 16, 1939, Serial No. 309,630

4 Claims. (Cl. 219—35)

This invention relates to a broiler-griddle attachment for an electric roaster and, more specifically to a reflector and heating unit assembly for such an attachment.

This application is a division of our copending application Serial No. 252,952, filed January 26, 1939, and assigned to the assignee of this application.

It is an object of this invention to provide an attachment of the aforementioned type with a new and improved heating unit assembly which can be removably mounted so that the attachment may be readily and easily cleaned.

More specifically, it is an object of this invention to provide such an attachment with a frame, having a reflecting surface and a cooking surface, and a heating unit assembly having simple and readily actuated means for detachably mounting the heating unit in the frame so that the unit may be removed to facilitate cleaning of the surfaces.

It is a further object of this invention to provide a new and improved heating unit assembly and an arrangement for detachably mounting the same to the surface with which it is used.

It is a still further object of this invention to provide a heating unit assembly with simple and inexpensive means for preventing short-circuiting of the electrical terminals thereon when the assembly is mounted in position in the attachment and is connected to a source of electrical energy.

Further objects and advantages of this invention will become apparent as the following description proceeds and the features of novelty which characterize this invention will be pointed out with particularity in the claims appended to and forming a part of the specification.

For a more complete understanding of this invention reference should be had to the accompanying drawings in which Fig. 1 represents a fragmentary elevation partly in section of an electric roaster having the broiler and griddle attachment of this invention in its operative position; Fig. 2 represents a plan view, partly in section, of the arrangement shown in Fig. 1; Fig. 3 is an end view of the arrangement shown in Figs. 1 and 2; Fig. 4 is a detailed view of the hinge construction showing the position of the broiler when rotated to its full open position; Fig. 5 is a detailed view, partly in section, of the means for vertically adjusting the broiling unit, the latter being moved the maximum distance above the broiling pan; Fig. 6 is a detailed view of the hinge construction and adjusting means taken on the line 6—6 of Fig. 3; Fig. 7 is a partial plan view of the removable heating unit; Fig. 8 is an elevation, partly in section, of the heating unit shown in Fig. 7; and Fig. 9 is a detailed view of a portion of one end wall of the broiling unit showing the means for locking the heating unit in position.

Referring to Figs. 1 and 2, this invention is shown as applied to an electric roaster having outer walls 10 and inner walls 11 which define a roasting well 12 in which is located a suitable rack 13 upon which are arranged cooking utensils 14. A suitable insulating material 15, such as rock wool, is located between the inner and outer walls of the roaster. It will be understood that heating elements (not shown) are arranged between the inner and outer walls adjacent the side and bottom walls of the roaster well and embedded in the insulating material 15. The outer and inner walls of the roasting unit are adapted to overlap and form a circumferential joint 16 at the top of the roaster well and a marginal flange 17 is provided in the inner wall 11 adjacent the circumferential joint. In some roaster constructions it is customary to use a removable well within the roaster well. In those instances where such a construction is employed, it is to be understood that the marginal flange will be provided adjacent the top portion of the removable well.

Supported on the marginal flange 17 is an inverted pan 18 having vertical extending side walls 19 and a dished upper surface 20. Attached to the walls 19 are suitable handles 19a. Located in the center of the upper surface is an opening 21 and the surface is sufficiently dished so that it has a substantial slope toward the opening 21 except at the edge 22 adjacent the side walls 19. Arranged in the dished upper surface is a rack 23 upon which is placed the food to be broiled. It will be observed that, due to the sloping of the surface 20, the rack is spaced therefrom except at its edges. The surface 20 is highly polished and is adapted to reflect heat radiated thereto.

The entire structure just described constitutes a broiling pan for supporting the food to be broiled. It will be observed that the pan is of such construction and is supported in such a manner that it is unnecessary to remove the cooking utensils 14 located in the roaster well in order to use the broiler attachment. This is a distinct advantage especially in those cases where the roaster has been used to prepare other foods to be served with the broiled food. The sloping surface of the broiling pan constitutes a drain for any grease which drips from the food being broiled. The grease will run down this sloping surface and drain through the opening 21. A drip pan 24 is located in the roaster well to catch the grease drained through opening 21. It will be observed that the pan 24 is provided with circumferentially spaced bosses 25 which make it possible to support the drip pan within the top of one of the cooking utensils 14 as illustrated in Figs. 1 and 3.

Located adjacent the broiling pan 18 is a frame or reflector 26 having end walls 27 and 27a and a top wall 28 firmly secured thereto by means of rivets 29. The top wall 28 is pressed from a flat sheet of suitable material, such as aluminum, and includes side walls 30 and 31 which slope downwardly and outwardly from the remaining flat portion of the top wall. The under surface 32 of the top wall is provided with a suitable surface which will reflect heat radiated thereto and the sloping portions 30 and 31 tend to concentrate the heat on the broiling pan 18. Pressed into the flat surface of the top wall 28 is a dished portion 33, the surface of which is arranged to slope slightly toward the center at which an opening 34 is located. This surface 33 is adapted to serve as a griddle surface as will more fully appear hereinafter.

Removably mounted in the reflector 26 is a heating unit assembly 35 which is a unitary structure comprising a support having a pair of longitudinally extending bars 36 which are arranged and maintained in substantially parallel relation by a transversely extending bar 37 (Fig. 1) attached to the bars adjacent one end, and an L-shaped plate 38 attached to the bars of the other end. Arranged intermediate the bar 37 and the plate 38 are a plurality of bars 39 extending transversely of the longitudinal bars 36 and having ends 40 which extend beyond these bars. The bar 37, the plate 38 and the bars 39 are soldered, welded or otherwise suitably secured to the longitudinal bars 36. Mounted in each of the ends 40 is an insulator 41 which is provided with a centrally arranged opening 41a and a circumferential groove 42. In mounting the insulators 41 in the ends 40 of the transverse supporting rods 39 a substantially U-shaped loop is formed in the ends and the insulator is set into this loop so that the rod 39 extends into the groove 42 provided in the insulator. The upper portion of the U-shaped loop is then bent downwardly so as to form a substantially closed loop about the insulator as shown in Fig. 3.

A pair of contact prongs 43 extends through and is firmly attached to one wall of the L-shaped plate 38. The prongs 43 are insulated from the wall of the plate 38 by means of washers 43a of suitable insulating material. A suitably coiled resistance wire 44 is threaded through the opening 41a in insulators 41 and is connected at its ends to the terminals 45 provided at the ends of the pair of prongs 43. The resistance wire 44 may be of any suitable material capable of generating and withstanding the operating temperatures of the broiling unit.

Provided in the L-shaped plate 38 of the heating unit assembly 35 is a latch receiving opening 46 through which extends a resilient latching member or clip 47 which is firmly attached at one end by means of a rivet 48 to the horizontally extending portion of the L-shaped plate 38. Provided in the clip 47 is a detent 47a (Figs. 1 and 8), the purpose of which will more fully appear hereinafter. It will be observed that the resilient clip 47 extends substantially parallel to the contact prongs 43 but is spaced above the prongs as shown in Figs. 1 and 8. With such an arrangement, short circuiting of the heating unit by accidentally dropping a kitchen utensil, such as a knife or a fork, on the contact prongs is prevented in a case where an electrical attachment plug does not completely cover the contact prongs 43 or is pushed only part way on.

Provided in one end wall 27a of the frame or reflector 26 adjacent the top edge thereof is a pair of support receiving openings 49 (Fig. 3) adapted to receive the ends of the longitudinally extending bars 36. Provided in the opposite end wall 27 of the frame 26 is a similarly located pair of support receiving openings 50 (Figs. 3, 7 and 9) adapted to receive the opposite ends of the longitudinally extending bars 36. Also provided in the same end wall 27 is an opening 51 through which is adapted to extend the contact prongs 43. The opening 51 is provided with a recess 52 adapted to receive the resilient clip 47. By means of the cooperation between the resilient clip 47 and the recess 52, the heating unit assembly is firmly locked in position. In inserting the heating unit in the frame or reflector 26, the ends of the rods 36 adjacent the bar 37 are inserted in the openings 49 and the heating unit is moved to the left a distance sufficient to permit the contact prongs 43 to clear the side wall 27. The unit is then moved upwardly until the prongs are opposite the opening 51. It is then moved to the right until the end of the resilient clip 47 engages the recess 52, which is of such depth that the engagement of the clip 47 therewith automatically aligns the right-hand end of the bars 36 with the openings 50 thereby facilitating the insertion of the bars into these openings. Upon further movement to the right, the clip 47 rides on the portion of the end wall 27 until the detent 47a snaps over the end wall and firmly locks the heating unit assembly in position, the vertically extending wall of the plate 38 abutting the inner side of the end wall 27 whereby sliding movement of the heating unit in either direction is precluded.

The heating unit assembly and the reflector constitute the broiling unit. With such a broiling unit, it is desirable to have it readily removable from the roaster when it is no longer needed and yet hinged to the roaster when in use. Furthermore, it is desirable to have such a broiling unit adjustable to accommodate different types of food and to control the transmission of heat thereto. Turning to the structure for accomplishing these ends in accordance with this invention, it will be observed that a pair of hinge brackets 53 is mounted on the outside wall 10 of the roaster. These hinge brackets are firmly held in position by means of rivets 54 which are adapted to extend through a reenforcing plate 55 extending along the inside of the wall 10 adjacent the point of attachment of the hinge bracket 53. Each hinge bracket is provided at one end with a slotted portion 56 which is used in hinging the roaster cover (not shown) to the roaster during roasting operations. Provided in the end of each hinge bracket remote from the slot 56 is a stud 57 extending outwardly from the sides thereof. A hinge plate 58 of substantially channel shape having a pair of side walls 59 and 60 between which extends a wall 61 is adapted to be movably mounted on the studs 57. In order to effect this mounting a recess or a slot 62 is cut into each of the side walls 59 and 60 adjacent the lower end thereof. The studs 57 are adapted to be inserted in the slots 62 thereby forming a rotatable or hinged mounting between the hinge plate 58 and the outside wall 10 of the roaster. Provided in the wall 61 of the hinge plate along the longitudinal center thereof and extending substantially throughout the length of this wall is a slot 63, the purpose of which will be described presently.

Mounted on the side wall 30 of the top wall 28 of the reflector 26 is a substantially L-shaped bracket 64 which is firmly fixed to the wall 30 by means of rivets 65. The bracket 64 is provided with a vertically extending portion of substantial length and of such width that it can be inserted between the side walls 59 and 60 of the channel shaped hinge plate 58. Provided in this vertically extending portion of the bracket 64 is a pair of studs 66 which are adapted to be inserted in the slot 63 provided in the hinge plate. It is apparent that with such an arrangement the frame 26 and the heating unit assembly mounted therein can be moved relative to the hinge plate and hence vertically adjusted with respect to the top of the roaster well and the broiling pan 18 supported thereon. The bracket 64 is also provided with a threaded opening 67 into which is screwed a thumb screw 68 which is provided with a washer 69 adapted to clamp or lock the bracket 64 and the associated broiler unit firmly in its vertically adjusted position, the thumb screw and washer arrangement firmly clamping the hinge plate and bracket in fixed relation with respect to each other. In order to prevent complete disengagement of the thumb screw with the bracket 64 the end of the thumb screw is peened over thereby making it impossible to remove it from the threaded portion 67.

As already pointed out, the broiler unit by means of the hinge plate and its pivotal connection to the hinge bracket 53 is adapted to be rotated with respect to the roaster. This means that the broiler unit can be swung from a horizontal position, such as shown in Figs. 1, 2 and 3, to a substantially vertical position, as shown in Fig. 4. In order to facilitate this swinging movement, a handle 70 (Figs. 2 and 3) is provided in suitable openings 71 provided on the side wall 31. The handle 70 is made of some suitable resilient material and is adapted to be inserted into the openings 71 and then spring into position so that it extends substantially perpendicularly to the inclined wall 31 at all times thereby preventing it from becoming unduly heated during the broiling operation. Integral with the hinge plate is a flange 72 which extends substantially perpendicular to the wall 61 of the hinge plate. This flange 72 serves as a stop to limit the counterclockwise rotation of the broiling unit. When the flange 72 engages the outside wall 10 of the roaster, the broiler unit is in a substantially vertical position as shown in Fig. 4. The clockwise rotation of the hinge plate and broiling unit is limited by the engagement of the walls 59 and 60 of the channel shaped hinge plate with a wall 10 of the roaster. When these side walls engage the roaster wall, the broiling unit is substantially horizontal as shown in Fig. 3.

As previously pointed out, openings 21 and 34 are provided in the griddle surface 33 and the surface 20 of the broiling pan respectively and the respective surfaces slope toward the openings. During the operation of the attachment as either a broiler or a griddle surplus grease is drained from the surface through the openings and into the pan 24.

In operation, as a broiling unit, the cover of the roaster is removed and without disturbing the contents of the roaster well the broiling pan 18 including the rack 23 is mounted on the marginal flange 17 provided at the top of the roaster well. The frame 26 and its associated heating units are then mounted on the roaster by inserting the studs 57 in the slots 62 provided in the side walls 59 and 60 of the hinge plate 58. During this operation, the frame and hinge plate are in the position shown in Fig. 4. The food to be broiled is then placed on the rack 23 and the frame and heating unit are rotated to the position shown in Figs. 1 and 3. Depending upon the food to be broiled and the manner in which it is to be broiled, the frame and heating unit are vertically adjusted with respect to the broiling pan by sliding the studs 66 in the slot 63 provided in the hinge plate. When the desired position is obtained, the frame and heating unit are locked in the adjusting position by means of the thumb screw 68. During the broiling of the food, it is unnecessary to disturb the adjustment of the frame and heating unit unless it is desired to alter the manner in which the food is being broiled. If it is desired to inspect or turn the food resting on the broiling pan rack, the frame and broiling unit may be rotated about the studs 57 in the manner indicated.

When the food has been placed in position and the frame adjusted to a suitable height, the contact prongs are inserted in a suitable plug connection to a source of power. The spring clip 47 is so spaced with respect to the contact prongs 43 that the insertion of the prongs in a suitable plug member prevents a downward unlatching movement of said clip thereby positively locking the heating unit in position making it impossible to remove the heating unit so long as the plug is in engagement with the contact prongs. With a source of energy connected to the contact prongs, the heating unit 35 is energized and heat is transmitted to the food supported on the broiler pan rack by direct radiation from the heating unit and also by reflection from the under surface of the top wall of the frame 26. In this manner the energy available for cooking is readily and efficiently transmitted to the material to be cooked. As previously explained, any grease which is produced during the broiling operation runs down the sloping surface of the broiling pan and through the opening 21 into the drip pan 24. In this way, the grease is quickly drained from the heated surface of the broiling pan and the undesirable smoking and burning of this grease is substantially eliminated.

When the attachment is to be used as a griddle, the drip pan and broiling pan are again arranged in the position shown, and the frame 26 is mounted on the roaster as shown in Fig. 3. With the heating unit connected to a source of energy in the manner described in connection with the description of the broiling operation, the unit is energized and heat is transmitted to the griddle surface 33 by direct radiation from the heating element and also by reflection from the surface 20 of the broiling pan 18. It is to be observed that the heating element is mounted adjacent the griddle surface thereby insuring that this surface will become sufficiently hot to suitably cook the food placed on the surface 33.

After the attachment has been used either as a broiler or as a griddle, the surfaces thereof may be readily cleaned by removing the frame from the roaster and then detaching the heating unit assembly from the frame. To detach the heating unit, it is only necessary to press downwardly on the spring clip 47 so that the detent 47a no longer engages the side wall 27 of the frame. The unit is then moved to the left until the ends of the contact prong 43 clear the end wall 27 of the frame. The unit is then moved downwardly and to the right until the bars 36 are removed from the openings 49 provided in the left-hand end wall 27a. With the heating unit removed, the surface of the frame may be thoroughly cleaned with water or other suitable cleaning agents.

From the foregoing description, it is apparent that in accordance with this invention there has been provided for an electric roaster a broiler and griddle attachment of simple and rugged construction which can be easily and conveniently operated without disturbing the contents of the roaster well. While this invention has been described in detail in connection with one form thereof, it is to be understood that it is not to be limited to this form and it is intended in the appended claims to cover all modifications thereof within the true spirit and scope of this invention.

What we claim as new and desire to secure by Letters Patent of the United States is:

1. In an electric cooking unit, a frame comprising a pair of end walls, each of said end walls having a plurality of support receiving openings therein, one of said end walls including in addition a terminal receiving opening, a removable electrical heating unit comprising a heating element and a support therefor, said support comprising longitudinally extending bars laterally spaced from each other, the ends of which are adapted to be inserted in said support receiving openings by a relative movement of said frame and said support, a plate mounted on said bars adjacent the ends which are supported by said end wall having the terminal receiving opening, a pair of terminal prongs to which the ends of said heating element are electrically connected mounted on said plate and adapted to extend through said terminal receiving opening, and a resilient clip mounted on said plate and adapted to engage an edge of said terminal receiving opening to detachably latch said support in its operative position relative to said frame, said clip having a portion extending beyond said edge above said terminal prongs so as to prevent accidental short circuiting of said prongs.

2. In an electric cooking unit, a frame comprising a top wall having a reflective surface on the under side thereof and a pair of end walls, each of said end walls having a pair of laterally spaced openings therein and one of said end walls having an elongated opening therein, an electric heating unit comprising a pair of longitudinally extending bars laterally spaced from each other and of sufficient length so that the ends thereof may be inserted through said pairs of laterally spaced openings to support said heating unit in its operative position, a coiled heating element, means for supporting said coiled heating element on said bars so that said heating element is symmetrically spaced relative to said reflecting surface, an L-shaped plate member mounted on one end of said longitudinal bars, terminal means mounted on said L-shaped member so as to project through said elongated opening when said heating unit is mounted in its operative position, and a resilient latch mounted on said L-shaped plate and adapted to extend through said elongated opening and engage the adjacent end wall of said frame so as to releasably latch said heating unit in its operative position, said resilient latch being mounted on said plate above said terminal means so that the projecting end thereof overlies said terminal means to prevent accidental short-circuiting thereof when said cooking device is in use.

3. In an electric cooking unit, a frame comprising a pair of end walls, each of said end walls having a plurality of support receiving openings therein, one of said end walls including in addition a terminal receiving opening, a removable electrical heating unit comprising a heating element and a support therefor, said support comprising longitudinally extending bars laterally spaced from each other, the ends of which are adapted to be inserted in said support receiving openings by a relative movement of said frame and said support, a plate mounted on said bars adjacent the ends which are supported by said end wall having the terminal receiving opening, a pair of terminals, to which the ends of said heating element are electrically connected, mounted on said plate and adapted to extend through said terminal receiving opening to receive a detachable electrical attachment plug, and a resilient clip mounted on said plate and adapted to engage an edge of said terminal receiving opening to detachably latch said support in its operative position relative to said frame, said clip having a portion adapted to cooperate with said plug and prevent movement of said clip to an unlatched position when said plug is received on said terminals.

4. In an electric cooking device, a frame member having an opening therein, an electric heating unit comprising a heating element and a support therefor, means for removably mounting said unit on said frame member, a resilient latch clip mounted on said support and adapted to extend through and engage the edge of said opening to detachably latch said heating unit in its operative position on said frame, and terminal prongs for said heating element adapted to receive an electrical attachment plug, said prongs being mounted on said support in spaced relation to said clip so that movement of said clip in a direction to unlatch said heating unit from said frame is precluded by engagement of said clip with said plug when said plug is connected to said prongs whereby said heating unit must be electrically disconnected by removal of said plug from said prongs before said clip can be actuated to unlatch said unit from said frame.

HARRY W. UHLRIG.
DAVID W. GUSTAVESON.